May 11, 1965   E. H. ARNAUDIN, JR   3,182,355
TUBE STRETCHING APPARATUS
Filed May 6, 1963
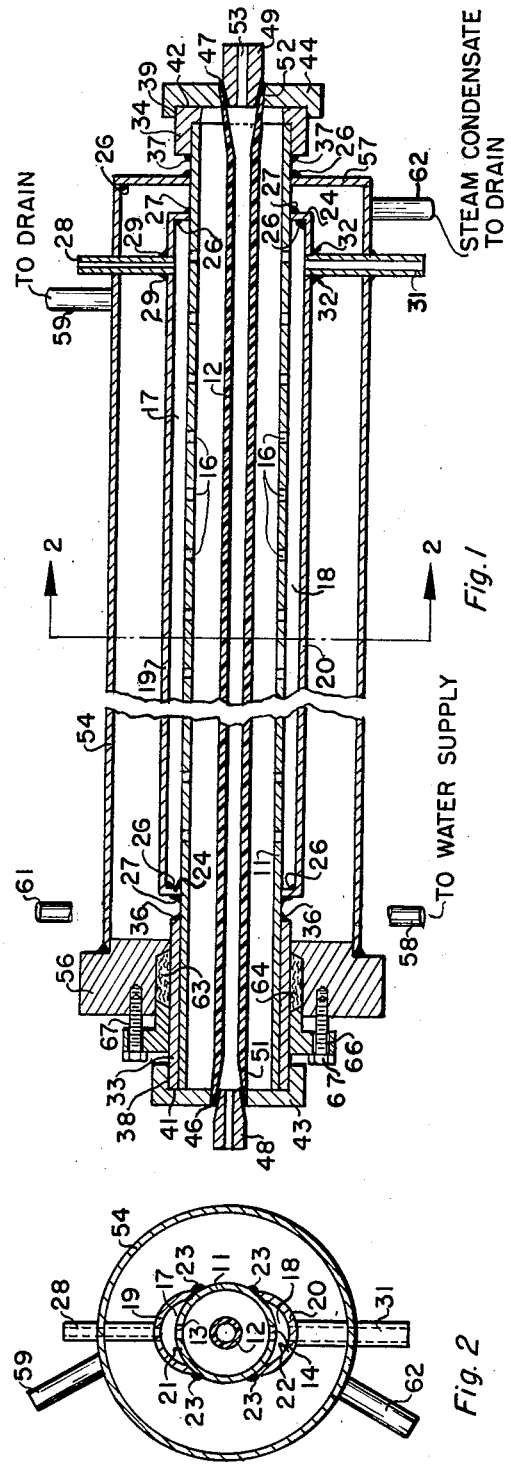
INVENTOR.
EDWIN H. ARNAUDIN, Jr.
HIS AGENT United States Patent Office 3,182,355
Patented May 11, 1965

3,182,355
TUBE STRETCHING APPARATUS
Edwin H. Arnaudin, Jr., Marion, Ind., assignor, by mesne assignments, to Anaconda Wire and Cable Company, a corporation of Delaware
Filed May 6, 1963, Ser. No. 278,085
6 Claims. (Cl. 18—19)

My invention relates to apparatus for stretching lengths of shrinkable tubing and particularly to such apparatus for stretching tubing while heating the same and for cooling the said tubing in a stretched condition.

To manufacture shrinkable tubing, lengths of the tubing are stretched radially while at a temperature higher than that at which the tubing will be used but below its softening point. The tubing is thereafter cooled while still in the stretched condition. It is a property of tubing of the type for which the apparatus of my invention is intended that it will retain its stretched dimensions for long storage periods at room temperature but will return to its original dimensions if it is again heated to some critical temperature that is below its softening point. If, upon reheating, the shrinkable tubing is mechanically restrained from fully shrinking to its original dimensions, it will remain in a condition of elastic stretching and exert a pressure upon the restraining means. Where the restraining means is an electrical connection or joint it is desirable to have the tubing shrink radially but not lengthwise since there would be nothing to restrain the lengthwise shrinkage and the joint would be uncovered by any shortening of the tubing due to shrinkage. To prevent lengthwise shrinkage of the stretched tubing it is essential that the initial stretching shall be radial only, with no increase taking place in the original length of tubing.

For the above stated purpose I have invented a tube stretching apparatus comprising a length of pipe with a wall sufficiently thick to withstand atmospheric pressure and a plurality of perforations positioned in at least one straight line. Preferably my pipe has two lines of perforations spaced 180° apart which have surprisingly been found capable of expanding the tubing to fill the entire pipe. My apparatus also comprises means forming at least one chamber lengthwise of the pipe enclosing the line of perforations and hermetically sealed to the pipe with the pipe forming one of the walls of the chamber. There are means evacuating the chamber thereby stretching the tubing and means sealing a flexible tubing that is contained within the pipe to the pipe ends while still permitting fluid to enter the tubing. My apparatus also comprises means for heating and preferably also for cooling the pipe, such as a container enclosing the pipe through which a temperature controlling fluid can be circulated.

A more thorough understanding of my apparatus can be gained by reference to the appended drawing.

In the drawing:

FIGURE 1 is a lengthwise section through my apparatus.

FIGURE 2 is a section through the lines 2—2 of FIGURE 1.

In the embodiment of my apparatus shown in the drawing a pipe 11 having a length about equal to lengths of tubing 12 to be stretched has two lines 13, 14 of perforations 16 through its walls. A lengthwise chamber 17 encloses the line of holes 13 and a similar chamber 18 encloses the line of holes 14. The chambers 17, 18 which are conveniently made from half-cylinders 19, 20 are completed by sections 21, 22 of the pipe 11 to which the half-cylinders are sealed by lengthwise welds 23. The ends of the chambers 17, 18 are closed by walls 24 sealed by means of welds 26 to the half-cylinders 19, 20 and by welds 27 to the pipe 11. A vacuum nipple 28 communicates with the chamber 17 and is hermetically sealed to the half-cylinder 19 by means of welds 29, and a similar vacuum nipple 31 communicates with the chamber 18 and is hermetically sealed to the half-cylinder 20 by means of welds 32. A ground sleeve 33 and a fitting 34 are hermetically sealed to the respective left and right ends of the pipe 11 by means of respective welds 36, 37. The sleeve 33 and fitting 34 are accurately ground at the cylindrical surfaces 38, 39 and end surfaces 41, 42 to accept adaptors 43, 44 which are ground to have a vacuum tight fit over the sleeve 33 and fitting 34. The adaptors 43, 44 have tapered bores 46, 47 which match tapered plugs 48, 49. The length 12 of tubing to be stretch is sealed within the pipe 11 by wedging one end portion 51 between the plug 48 and the bore 46 and another end 52 between the plug 49 and bore 47. Both, or at least one of the plugs 48, 49 has a central bore 53 which permits free air or air, or other fluid, under controlled pressure to enter the length of tubing 12. When fluid under controlled pressure is to be introduced into the tubing 12, a flexible hose of known type can be fitted over the plug 48 while the plug 49 will be free from any bore 53. Alternatively the plug 48 may be threaded in a known manner to accept a threaded hose coupling. A cylindrical container or jacket 54 encloses almost the entire length of the pipe 11 and the half-cylinders 19, 20. The jacket 54 is closed around the pipe 11 by end sections 56, 57. Nipples 58, 59 connect the jacket to a cold water supply not shown by means of valves arranged in a known manner and also not shown. Additional nipples 61, 62 connect the container to a steam supply and a condensate drain in a known manner with appropriate valves not shown.

In order to permit differential expansion of the tube 11 relative to the jacket 54 the end section 56 which has a slide fit on the sleeve 33 is made wide enough to contain a recess 63 for steam packing 64. The packing 64 can be compressed by an insert 66 upon tightening threaded bolts 67.

*Operation*

To expand a length 12 of tubing by means of my apparatus it is fitted within the pipe 11 and secured by the plugs 48, 49 in such manner that there is no air leakage between the outside of the tubing and the inside of the pipe. Steam is then introduced through the nipple 61 into the jacket 54 until the tubing has reached a temperature below its softening point at which it can be stretched without returning to its original shape when cold. The air is then evacuated through the nozzles 28, 31 by known means to exhaust the chambers 17, 18. The air is thus drawn from the pipe 11 externally of the tubing 12 through the holes 16. Surprisingly, I have discovered that although there are only 2 rows of such holes the tubing 12 will be thoroughly stretched in a radial direction and that it is not necessary to make the pipe 11 of a porous material or to have perforations distributed over its entire circumference. The advantage of this discovery is that the heating and cooling fluids can thus be applied directly to the pipe 11 at the major area of its surface that is not covered by the half-cylinders 19, 20. If a porous pipe were used it would, of course, be necessary to surround it entirely with a vacuum chamber and heat-transfer directly to and from the pipe, and thus to and from the tubing 12 would be impossible.

After the tube has expanded, the steam is turned off while still maintaining vacuum and cold water is permitted to pass through the container 54 until the tubing 12 has cooled, preferably, at least to room temperature. During the cooling cycle the length of tubing 12 is pressed in intimate contact with the inner wall of the pipe 11 and since cooling water can reach the outside of the pipe, extraction of heat from the tubing is rapid and efficient. When the tubing has cooled, the plugs 53, 54 are removed and the stretched tubing is withdrawn from the pipe 11 and stored.

I have invented a new and useful apparatus for which I desire an award of Letters Patent.

I claim:
1. Apparatus for stretching tubing comprising:
(A) a length of pipe having a wall sufficiently thick to withstand atmospheric pressure,
(B) a plurality of perforations through said pipe,
   (a) said perforations being positioned in a straight line on the surface of said pipe,
(C) means forming a chamber lengthwise of said pipe
   (a) having said pipe as one of the walls thereof,
   (b) said chamber enclosing said line of perforations and
   (c) said chamber being hermetically sealed to said pipe so as to leave a major area of said pipe uninclosed thereby,
(D) means evacuating said chamber thereby stretching said tubing,
(E) means sealing a length of flexible tubing contained within said pipe to the ends thereof
   (a) while permitting fluid to enter said tubing, and
(F) means heating said pipe.

2. Apparatus for stretching tubing comprising:
(A) a length of pipe having a wall sufficiently thick to withstand atmospheric pressure,
(B) a plurality of perforations through said pipe,
   (a) said perforations being positioned in a straight line on the surface of said pipe,
(C) means forming a chamber lengthwise of said pipe
   (a) having said pipe as one of the walls thereof,
   (b) said chamber enclosing said line of perforations and
   (c) said chamber being hermetically sealed to said pipe so as to leave a major area of said pipe uninclosed thereby,
(D) means evacuating said chamber thereby stretching said tubing,
(E) means sealing a length of flexible tubing contained within said pipe to the ends thereof
   (a) while permitting fluid to enter said tubing, and
(F) means alternately heating and cooling said pipe.

3. Apparatus for stretching tubing comprising:
(A) a length of pipe having a wall sufficiently thick to withstand atmospheric pressure,
(B) a plurality of perforations through said pipe,
   (a) said perforations being positioned in a straight line on the surface of said pipe,
(C) means forming a chamber lengthwise of said pipe
   (a) having said pipe as one of the walls thereof,
   (b) said chamber enclosing said line of holes, and
   (c) said chamber being hermetically sealed to said pipe so as to leave a major area of said pipe uninclosed thereby,
(D) means evacuating said chamber thereby stretching said tubing,
(E) means sealing a length of flexible tubing contained within said pipe to the ends thereof,
   (a) while permitting fluid to enter said tubing,
(F) a container enclosing said pipe, and
(G) means for circulating temperature controlling fluid through said container.

4. Apparatus for stretching tubing comprising:
(A) a length of pipe having a wall sufficiently thick to withstand atmospheric pressure,
(B) a plurality of perforations through said pipe,
   (a) said perforations being positioned in two straight lines, 180 degrees apart, on the surface of said pipe,
(C) means forming two chambers lengthwise of said pipe,
   (a) each of said chambers having said pipe as one of the walls thereof,
   (b) each of said chambers enclosing one of said lines of perforations, and
   (c) said chambers being hermetically sealed to said pipe so as to leave a major area of said pipe uninclosed thereby,
(D) means evacuating said chambers thereby stretching said tubing,
(E) means for sealing said tubing contained within said pipe to the ends thereof,
   (a) while permitting fluid to enter said tubing, and
(F) means heating said pipe.

5. Apparatus for stretching tubing comprising:
(A) a length of pipe having a wall sufficiently thick to withstand atmospheric pressure,
(B) a plurality of perforations through said pipe,
   (a) said perforations being positioned in two straight lines, 180 degrees apart,
(C) means forming two chambers lengthwise of said pipe,
   (a) each of said chambers having said pipe as one of the walls thereof,
   (b) each of said chambers enclosing one of said lines of perforations, and
   (c) said chambers being hermetically sealed to said pipe so as to leave a major area of said pipe uninclosed thereby,
(D) means for evacuating said chambers thereby stretching said tubing,
(E) means for sealing said tubing contained within said pipe to the ends thereof,
   (a) while permitting fluid to enter said tubing, and
(F) means for heating and cooling said pipe.

6. Apparatus for stretching tubing comprising:
(A) a length of pipe having a wall sufficiently thick to withstand atmospheric pressure,
(B) a plurality of perforations through said pipe,
   (a) said perforations being positioned in two straight lines, 180 degrees apart,
(C) means forming two chambers lengthwise of said pipe,
   (a) each of said chambers having said pipe as one of the walls thereof,
   (b) each of said chambers enclosing one of said lines of perforations, and
   (c) said chambers being hermetically sealed to said pipe so as to leave a major area of said pipe uninclosed thereby,
(D) means for evacuating said chambers thereby stretching said tubing,
(E) means for sealing said tubing contained within said pipe to the ends thereof,
   (a) while permitting fluid to enter said tubing,
(F) a container enclosing said pipe, and
(G) means for circulating temperature controlling fluid through said container.

References Cited by the Examiner

UNITED STATES PATENTS

| | | | |
|---|---|---|---|
| 277,019 | 5/83 | Eddy | 18—6 |
| 1,324,850 | 12/19 | Roberts. | |
| 1,737,874 | 12/29 | Busch | 18—56 |
| 2,320,564 | 6/43 | Brooks | 18—6 |
| 2,494,273 | 1/50 | Wigal | 18—19 |
| 2,756,458 | 7/56 | Krupp et al. | 18—6 |

FOREIGN PATENTS 214,099  9/57  Australia.

WILLIAM J. STEPHENSON, *Primary Examiner.*